(12) United States Patent
Sausner et al.

(10) Patent No.: US 7,533,909 B2
(45) Date of Patent: May 19, 2009

(54) TUBE CONNECTION DEVICE

(75) Inventors: Andreas Sausner, Frankfurt (DE); Uwe Fiedler, Hockenheim (DE); Rainer Schumacher, Eppelheim (DE); Ralf Zahn, Reilingen (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 473 days.

(21) Appl. No.: 11/189,292

(22) Filed: Jul. 26, 2005

(65) Prior Publication Data

US 2006/0028017 A1 Feb. 9, 2006

(30) Foreign Application Priority Data

Aug. 3, 2004 (EP) .................................. 04018343

(51) Int. Cl.
*F16L 19/00* (2006.01)
(52) U.S. Cl. .................................... 285/353; 285/384
(58) Field of Classification Search ................. 285/353, 285/384, 207, 208, 209, 206
See application file for complete search history.

(56) References Cited

U.S. PATENT DOCUMENTS

| | | | | |
|---|---|---|---|---|
| 2,835,305 | A * | 5/1958 | Boyer | 152/427 |
| 5,129,688 | A * | 7/1992 | McGarvey | 285/328 |
| 5,169,182 | A * | 12/1992 | Hashimoto | 285/332.2 |
| 5,172,939 | A | 12/1992 | Hashimoto | |
| 5,516,157 | A * | 5/1996 | Williamson | 285/212 |
| 5,667,255 | A * | 9/1997 | Kato | 285/133.4 |
| 5,924,747 | A | 7/1999 | Miyashita | |
| 6,050,611 | A | 4/2000 | Asada | |
| 6,213,095 | B1 * | 4/2001 | Asada et al. | 123/456 |
| 6,408,826 | B2 * | 6/2002 | Asada et al. | 123/468 |
| 6,494,183 | B2 * | 12/2002 | Usui et al. | 123/456 |
| 6,497,220 | B1 | 12/2002 | Boecking | |
| 6,527,304 | B1 * | 3/2003 | Pliassounov | 285/334.5 |
| 6,543,817 | B1 * | 4/2003 | Turner et al. | 285/353 |
| 6,663,146 | B1 * | 12/2003 | Sakai et al. | 285/353 |

* cited by examiner

*Primary Examiner*—David E Bochna
(74) *Attorney, Agent, or Firm*—Leydig, Voit & Mayer Ltd.

(57) ABSTRACT

A tube connection device for connecting motor vehicle tubes, a tube having a front element on at least one end, this front element being equipped with a frontal sealing surface. A fitting enclosing the tube is provided, which presses the frontal sealing surface against a connection surface of a connection element. At least one separate pressure element, which at least partially surrounds the tube, is provided between fitting and front element. The fitting acts on the front element through the pressure element and the sealing surface is pressed against the connection surface in this way.

20 Claims, 3 Drawing Sheets

TUBE CONNECTION DEVICE

BACKGROUND OF THE INVENTION

The present invention relates to a tube connection device for connecting tubes, particularly motor vehicle tubes, having a front element on at least one end, equipped with a frontal sealing surface and a fitting enclosing the tube and pressing and/or compressing the frontal sealing surface of the front element against a connection surface of a connection element.

A tube connection device of the type described above is known from practice. In this tube connection device, the connection element is implemented as a connection block which has a threaded bore, into which the fitting, which is provided with an external thread, may be screwed in with the received tube end. The front element of the tube end is typically implemented as a flange in this case and the frontal sealing surface of this flange is pressed against the connection surface of the connection block by screwing in the fitting. The fitting engages behind the flange and/or is directly applied to the flange.

In order that a functionally reliable connection is ensured here, sufficiently high clamping forces are necessary under all operating conditions. Because of the different material combinations, different coefficients of friction arise at the contact point between fitting and back of the flange and, in addition, at the contact point between the sealing surface of the flange and the connection surface. Typically, the coefficient of friction of the contact between fitting and flange back is higher than the coefficient of friction of the contact between the sealing surface of the flange and the connection surface.

As the fitting is screwed in, the tube may also rotate and a torque is more or less stored in the tube through torsion of the tube. This torsion of the tube generates an undesirable restoring torque, which may result in uncontrolled detachment of the connection. It is important to avoid this detachment of the screw connection because of torsion of the tube as much as possible.

The tube connection device known from practice is distinguished by a further disadvantage. In order to avoid confusion of tubes and/or connection of an incorrect tube to a connection element, threads (of fitting and threaded bore) having different sizes are used. Such a use of components having different threads is complex and costly in regard to manufacturing and storage.

Furthermore, undesired corrosion may occur easily in the known tube connection devices. This is to be attributed to electrolytes being able to enter through the gap between fitting and tube end and being able to reach nearly all components of the connection device. Corrosion may then easily appear because of the different metallic components.

In contrast, the present invention is based on the technical object of specifying a tube connection device of the type cited at the beginning, in which the above-mentioned disadvantages may be effectively avoided.

To achieve this technical object, the present invention teaches a tube connection device for connecting tubes, particularly motor vehicle tubes, a tube having a front element on at least one end, this front element being equipped with a frontal sealing surface, a fitting enclosing the tube being provided, this fitting pressing the frontal sealing surface of the front element against a connection surface of a connection element, at least one separate pressure element which at least partially surrounds the tube being provided between fitting and front element, and the fitting acting on the front element through the pressure element and pressing the sealing surface against the connection surface in this way. The statements above relate to the mounted state of the tube connection device.

It is within the scope of the present invention that the front element is an element that has a larger diameter than the remaining tube and is preferably implemented as a flange. The front element is expediently a metallic element which is preferably formed onto the tube end in one piece.

According to a preferred embodiment of the present invention, the front element is a flange connected to the tube end. According to one embodiment, it is an F-flange. It is within the scope of the present invention that the flange has been formed as a metallic flange through cold forming of the tube end. The sealing surface is located at the front face of the flange and the pressure element according to the present invention presses against the flange back in the mounted state of the tube connection device.

It is within the scope of the present invention that there is a direct contact between the sealing surface of the front element and the connection surface of the connection element. The sealing surface is preferably implemented as conical and the connection surface is then expediently complementarily implemented as conical.

The separate pressure element is preferably an annular element which expediently completely surrounds the tube end. It is within the scope of the present invention that the pressure element presses against the external face of the tube end and presses against the back of the front element and/or the flange back in the mounted state of the tube connection device.

According to an especially preferred embodiment of the present invention, the coefficient of friction of the contact of sealing surface and connection surface is different from the coefficient of friction of the contact of fitting and pressure element and/or different from the coefficient of friction of the contact between pressure element and front element. The coefficients of friction are expediently significantly different in this case. According to a very preferred embodiment, which has very special significance of the scope of the present invention, the coefficient of friction of the contact of sealing surface and connection surface is greater than the coefficient of friction of the contact of fitting and pressure element and also greater than the coefficient of friction of the contact of pressure element and front element (flange). Setting the coefficients of friction may be performed through appropriate material selection for the components and/or for their surfaces. Setting the coefficients of friction may also be implemented through appropriate design of the surfaces, particularly through the selection of specific roughness and/or profiles.

It is within the scope of the present invention that the fitting is a screw fitting and that when producing a screw connection of the fitting, the front face of the fitting acts on the front element of the tube via the pressure element. In this way, the sealing surface of the front element is pressed against the connection surface of the connection element. Furthermore, it is within the scope of the present invention that the fitting has an external thread and may be screwed into a threaded bore of the connection element having a complementary internal thread. The connection surface is then expediently located at the bottom end of the threaded bore. In the completely screwed-in state of the fitting, the sealing surface is pressed against the connection surface. The connection element is preferably a connection block, in which a second tube which adjoins the connection surface is integrated. In other words, this connection surface then forms the end of the second tube integrated into the connection element.

The present invention is based on the recognition that by introducing a pressure element according to the present invention, undesired torsion of the tube and disadvantageous restoring torque connected therewith may be effectively reduced and/or avoided. This is particularly possible through targeted setting of the coefficients of friction of the contact between fitting and pressure element, between pressure element and front element, and between front element and/or sealing surface and connection surface. Using the measures according to the present invention, the torque acting on the tube may be effectively reduced. Torsion of the tube, which generates undesired restoring torque and may result in detachment of the screw connection, is effectively reduced and/or completely avoided. The measures according to the present invention have proven themselves above all in motor vehicle components and/or motor vehicle tubes. These are particularly fuel lines or lines for brake fluid. These tubes in motor vehicles are subjected to very special loads and have to fulfill very special requirements.

According to an especially preferred embodiment, which has very special significance of the scope of the present invention, the axial length of the pressure element is implemented according to the measure of axial length of the threaded bore. Axial lengths relate here to the length of the pressure element and/or the length of the threaded bore in the longitudinal direction and/or in the axial direction of the tube. It is within the scope of the present invention that the axial length of a pressure element assigned to a threaded bore is directly proportional to the axial length of the threaded bore. Therefore, the greater the length of the threaded bore, the greater the length of the pressure element assigned to this threaded bore as well.

Furthermore, it is within the scope of the present invention that pressure elements of different lengths are provided for different axial lengths of the threaded bore with identical axial lengths of the assigned fitting. According to a preferred embodiment of the present invention, the axial length of a threaded bore corresponds to the sum and/or approximately to the sum of the axial length of the assigned pressure element and the axial length of the screw thread of the assigned fitting and the axial length of the assigned front element. In other words, front element, pressure element, and screw thread of the fitting completely fill up a threaded bore and preferably none or only a small part of the fitting thread projects out of the threaded bore in this case.

With the aid of this embodiment of the present invention, incorrect connections of tubes may be avoided. For example, if a fitting having an assigned pressure element and received tube is inserted into an incorrect, too long threaded bore, a leaky connection results. In this way, incorrect connections may be recognized very easily. With the aid of this coding according to the present invention, the complexity described previously, which is associated with fitting and threaded bores having different sized threads, is dispensed with.

According to a preferred embodiment of the present invention, the pressure element surrounds the tube over at least a part of the axial length of the pressure element in a formfitting or fluid tight way. In the mounted state of fitting, pressure element, and tube, there is thus preferably no gap and/or almost no gap between pressure element and tube. A requirement for this embodiment is a little play between pressure element and tube. The pressure element is expediently pressed uniformly against the tube with the aid of the fitting. The external diameter of the tube and internal diameter of pressure element are preferably equal and/or almost equal.

According to an especially preferred embodiment, the pressure element is pressed against the tube in a formfitting way. This contact pressure of the pressure element is expediently produced using an end shaping tool and preferably around the entire circumference of the pressure element, so that no gap remains between the shaped pressure element and/or between the shaped part of the pressure element and the tube end. The present invention is thus based on the recognition that by pressing the pressure element in a form-fitting way, electrolytes may be prevented from reaching the remaining metallic elements of the tube connection device via the gap between fitting and tube and in this way corrosion of these metallic elements may be effectively avoided.

DETAILED DESCRIPTION OF THE DRAWINGS

Figure 1:
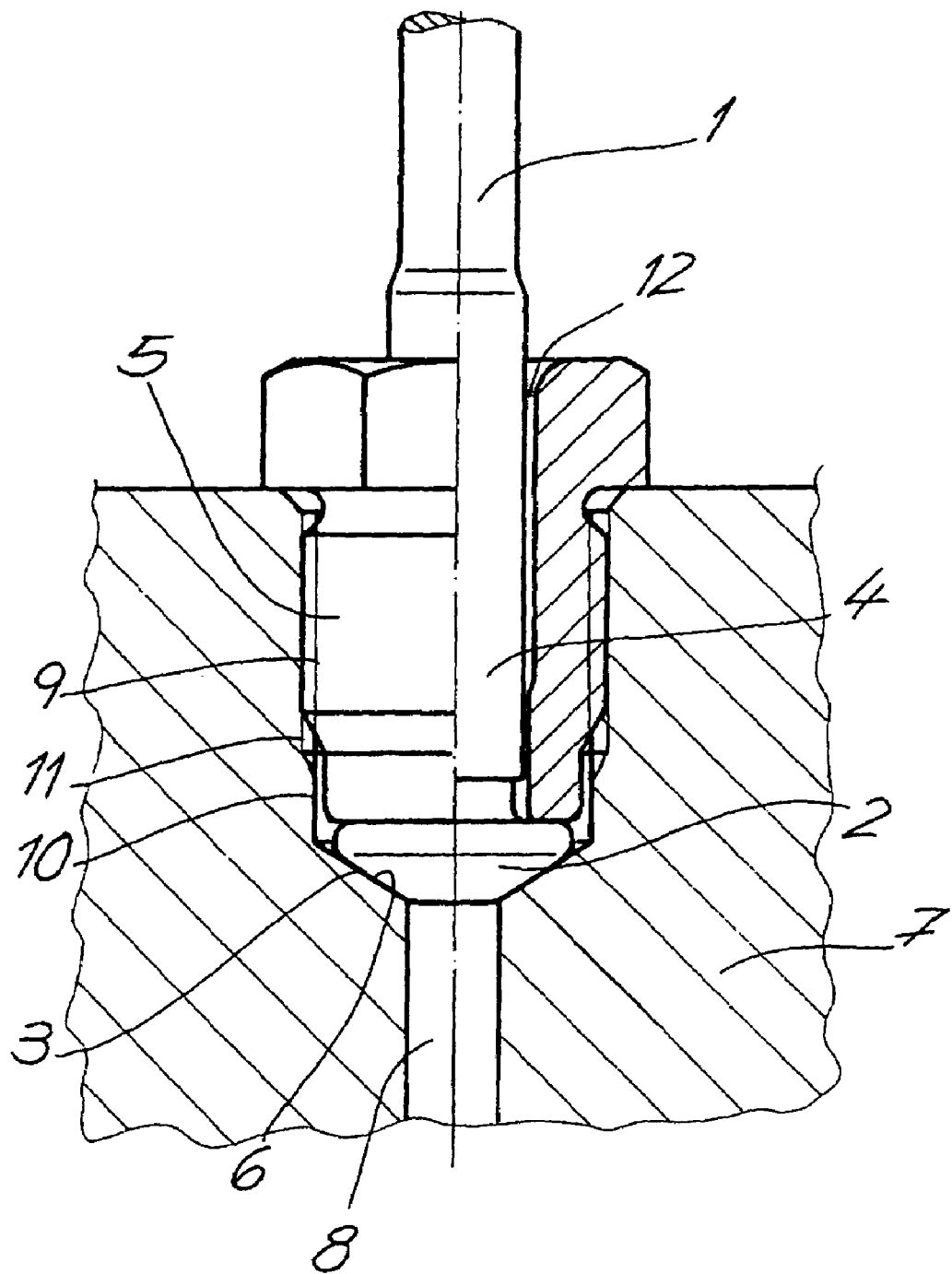
FIG. 1 is a view, partially in section, of a tube connection device according to the related art.

The figures show tube connection devices for connecting tubes, particularly motor vehicle tubes within a fluid system. In FIG. 1 a tube 1 has a front element on one end, which includes a flange 2 equipped with a frontal sealing surface 3. The flange 2 is preferably implemented, as in the exemplary embodiment, as an F-flange. This is a metallic flange 2, which is formed onto the tube end 4 in one piece in the exemplary embodiment. FIG. 1 shows that a fitting 5, which encloses the tube end 4 of the tube 1, is provided. This fitting 5 presses the frontal sealing surface 3 of the flange 2 against a connection surface 6 of a connection element. The connection element is implemented as a connection block 7 in the exemplary embodiment which forms part of a fluid system. The connection block 7 has an integrated second tube or passage 8 adjoining the connection surface 6 which is in fluid communication with the tube 1.

The fitting 5 is a screw fitting and this fitting 5 has an external thread 9, and may be screwed into a threaded bore 10 of the connection block 7. This threaded bore 10 has an internal thread 11 which is complementary to the external thread 9 of the fitting 5.

FIG. 1 shows a tube connection device according to the related art provided for connecting motor vehicle tubes 1. In the mounted and/or screwed-in state, the fitting 5 receiving the tube end 4 is applied directly to the flange 2 of the tube end 4 and presses its sealing surface 3 against the connection surface 6 of the connection block 7. As the fitting 5 is screwed in, twisting of the tube 1 and/or the tube end 4 may occur here. Through this torsion of the tube 1, torgue is stored in the tube 1 and an undesired restoring torque is generated, which may later result in detachment of the screw connection.

Furthermore, a gap 12 is recognizable between fitting 5 and tube end 4 in this embodiment known from the related art. Liquid and/or electrolytes may penetrate through this gap 12 and reach nearly all components of the tube connection device. Undesired corrosion may thus appear.

Figure 2:
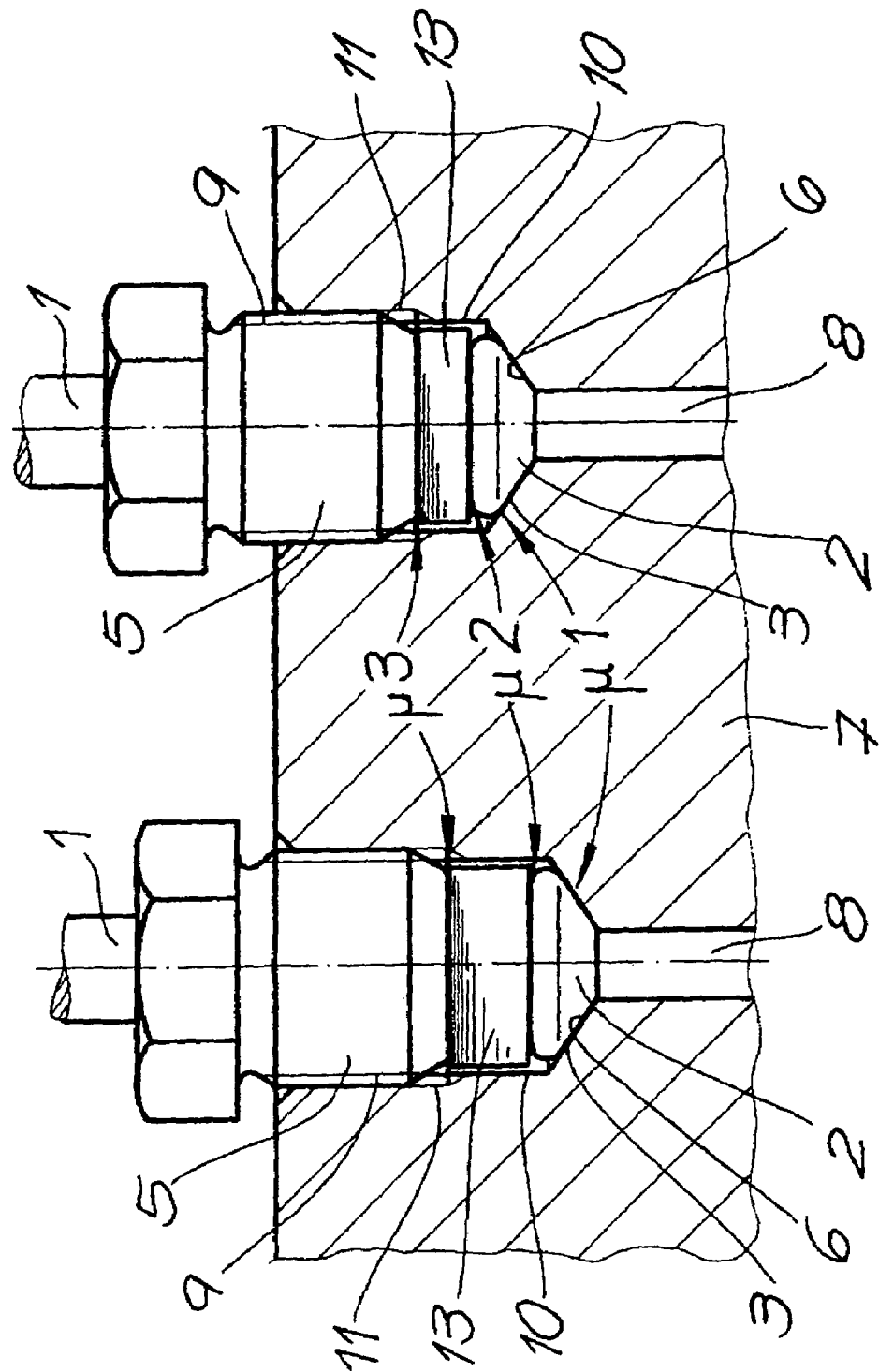
FIG. 2 is a view, partially in section, of a tube connection device according to the present invention and illustrating various features thereof.
Figure 3:
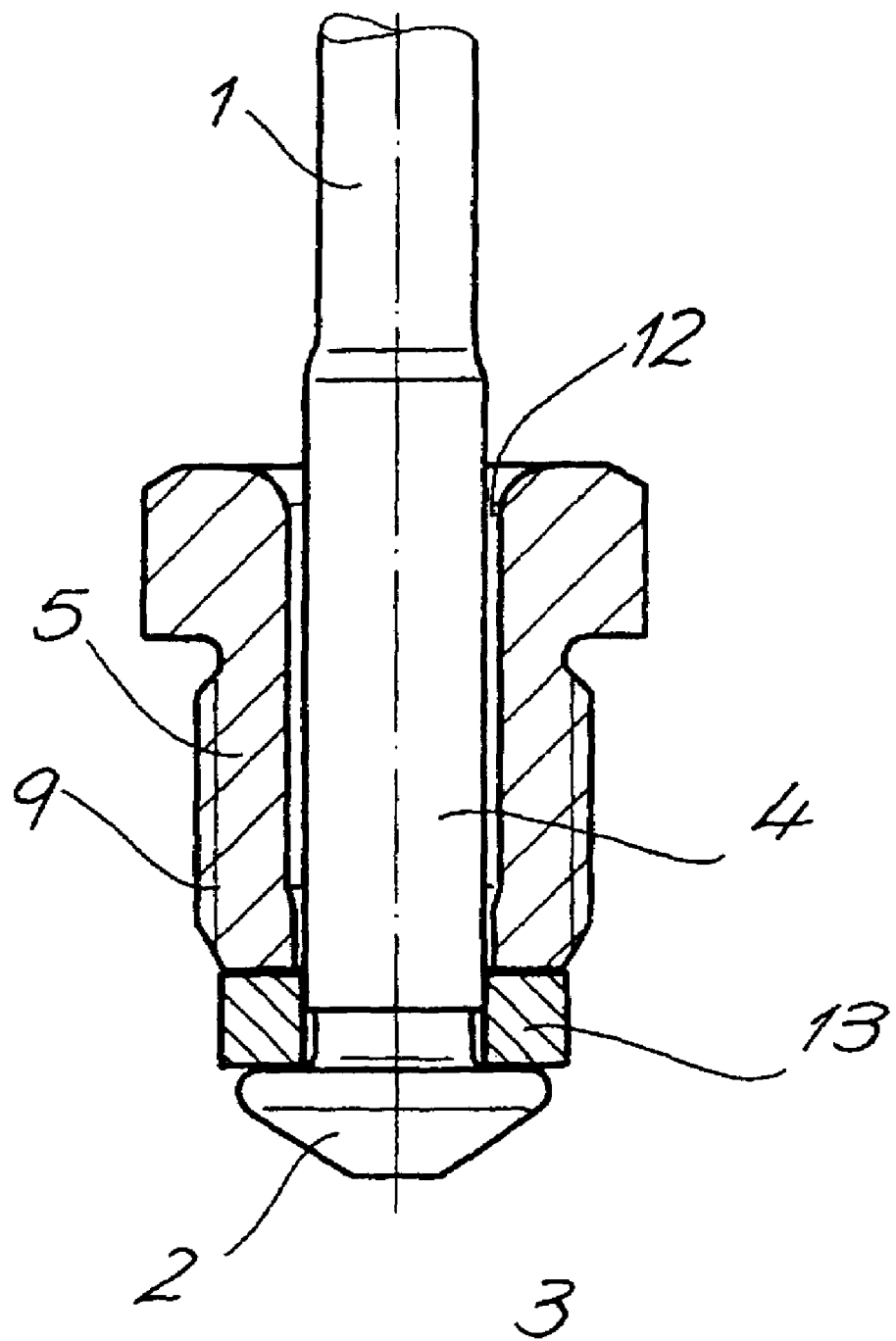
FIG. 3 is a view, partially in section, of a preferred embodiment of a tube connection device according to the present invention.

FIGS. 2 and 3 show a tube connection device according to the present invention. A separate pressure element 13, which surrounds the tube end 4, is provided between fitting 5 and front element and/or flange 2. The fitting 5 acts on the front element and/or the flange 2 through this pressure element 13 and the sealing surface 3 of the flange is pressed against the connection surface 6 of the connection block 7 in this way.

According to a very preferred embodiment of the present invention, the components are selected and/or set up in such way that the coefficient of friction μ1 of the contact between sealing surface 3 and connection surface 6 is greater than the coefficient of friction μ2 between pressure element 13 and flange 2 and is also greater than the coefficient of friction μ3 of the contact between fitting 5 and pressure element 13 (μ1>μ2, μ3). In this way, undesired twisting of the tube 1 and/or the tube end 4 may be avoided according to the present invention.

It may be seen from FIG. 2 that according to a preferred embodiment of the present invention, the axial length of the pressure element 13 is implemented according to the measure of the axial length of the threaded bore 10. In this regard, the threaded bore 10 on the left in FIG. 2 has an axial length from its opening in the connection block 7 to sealing surface 6 that exceeds the axial length of the threaded bore 10 in connection block 7 as shown on the right side of FIG. 2. As illustrated, the axial length of the pressure element 13 is thus greater at greater axial length of threaded bore 10 shown on the left side of FIG. 2. In this preferred embodiment of the present invention, pressure elements 13 of different axial lengths are used for different axial lengths of the threaded bore 10, with identical axial lengths of the assigned fitting 5. Steel is a suitable material for the pressure element 13.

A largely error-free assignment of the fitting 5 to the connection elements may thus be ensured. For example, if fitting 5 from the bore 10 on the right side of FIG. 2 having the assigned shorter pressure element 13 was inserted into the threaded bore 10 on the left side of FIG. 2, a leaky connection would result. It may then be recognized without anything further that this connection is incorrect. With the aid of this coding of the pressure elements 13 according to the present invention, it is not necessary that, as known from the related art, different fittings 5 having different sized external threads 9 must be provided. This reduces complexity and costs.

An especially preferred embodiment of the tube connection device according to the present invention is illustrated in FIG. 3. The pressure element 13 is pressed on the tube end 4 in a formfitting way over a part of its axial length around the entire circumference of the tube end 4. This region between pressure element 13 and tube end 4 is thus implemented without a gap. Such pressing of the pressure element 13 on the tube end 4 is expediently performed using a corresponding shaping tool. In this embodiment, liquid and/or electrolytes penetrating through the gap 12 between fitting 5 and tube end 4 is more or less retained by the pressure element 13 and may not reach the remaining components of the tube connection device. In this way, corrosion of the cited components is effectively avoided. In this context, the present invention is thus based on the recognition that a pressure element 13 according to the present invention may be used simultaneously as the sealing element on the tube end 4.

The invention claimed is:

1. A tube connection device for connecting a tube to a fluid system wherein,
    a connection element (7) defines a bore (10) and includes a connection surface (6);
    a tube (1) has a front element (2) on at least one end, said front element including a frontal sealing surface (3);
    a fitting (5) surrounds said tube (1) and urges said sealing surface (3) into sealing contact with said connection surface (6) of said connector element;
    at least one separate pressure element (13), which at least partially surrounds said tube (1), is provided between said fining (5) and said front element; and
    said fitting (5) acts on the front element through the pressure element (13) and presses the sealing surface (3) against the connection surface (6)
    wherein the coefficient of friction μ1 of the contact between sealing surface (3) and connection surface (6) is greater than the coefficient of friction μ2 of the contact of pressure element (13) and front element and is greater than the coefficient of fiction μ3 of the contact of fitting (5) and pressure element (13) and
    wherein said fitting (5) is a screw fitting and said bore (10) is threaded to receive said fitting, said fitting includes an end in contact with said pressure element (13) and said pressure element has a surface in contact with said front element (2).

2. The tube connection device according to claim 1 wherein the fitting (5) has an external thread (9) and may be screwed into said threaded bore (10) of the connection element having a complementary internal thread (11).

3. The tube connection device according to claim 2 wherein the axial length of the pressure element (13) is directly proportional to the measure of axial length of the bore (10) of the connection element.

4. The tube connection device according to claim 1 wherein the pressure element (13) surrounds the tube (1) in a formfitting way over at least a part of the axial length of the pressure element (13).

5. The tube connection device according to claim 4 wherein the pressure element (13) surrounds the tube (1) in a formfitting way over at least a part of the axial length of the pressure element (13) with no gap therebetween.

6. The tube connection device according to claim 5 wherein the pressure element (13) that surrounds the tube (1) in a formfitting way over at least a part of the axial length of the pressure element (13) is made of metal.

7. The tube connection device according to claim 6 wherein the axial length of the pressure element (13) is directly proportional to the measure of axial length of the bore (10) of the connection element.

8. The tube connection device according to claim 5 wherein the axial length of the pressure element (13) is directly proportional to the measure of axial length of the bore (10) of the connection element.

9. The tube connection device according to claim 4 wherein the axial length of the pressure element (13) is directly proportional to the measure of axial length of the bore (10) of the connection element.

10. The tube connection device according to claim 1 wherein the axial length of the pressure element (13) is directly proportional to the measure of the axial length of the bore (10) of the connection element.

11. A tube connection device for connecting a tube to a fluid system wherein,
    a connection element (7) defines a bore (10) and includes a connection surface (6);
    a tube (1) has a front element (2) on at least one end, said front element including a frontal sealing surface (3);
    a fitting (5) surrounds said tube (1) and urges said sealing surface (3) into sealing contact with said connection surface (6) of said connector element;
    at least one separate pressure element (13), which at least partially surrounds said tube (1), is provided between said fitting (5) and said front element; and said fitting (5) acts on the front element through the pressure element (13) and presses the sealing surface (3) against the connection surface (6)
wherein the coefficient of friction $\mu 1$ of the contact between sealing surface (3) and connection surface (6) is greater than the coefficient of friction $\mu 2$ of the contact of pressure element (13) and front element and is greater than the coefficient of friction $\mu 3$ of the contact of fitting (5) and pressure element (13)
   wherein said front element is a flange (2) on the end of said tube and said separate pressure element (13) surrounds an axial portion of said tube (1) and
   wherein said fitting is a screw fitting and said bore (10) is threaded to receive said fitting said fitting includes an end in contact with said pressure element (13) and said pressure element has a surface in contact with said flange (27).

12. The tube connection device according to claim 11 wherein the fitting (5) has an external thread (9) and may be screwed into said threaded bore (10) of the connection element having a complementary internal thread (11).

13. The tube connection device according to claim 12 wherein the axial length of the pressure element (13) is directly proportional to the measure of axial length of the bore (10) of the connection element.

14. The tube connection device according to claim 11 wherein the pressure element (13) surrounds the tube (1) in a formfitting way over at least a part of the axial length of the pressure element (13).

15. The tube connection device according to claim 14 wherein the pressure element (13) surrounds the tube (1) in a formfitting way over at least a part of the axial length of the pressure element (13) with no gap therebetween.

16. The tube connection device according to claim 15 wherein the pressure element (13) surrounds the tube (1) in a formfitting way over at least a part of the axial length of the pressure element (13) is made of metal.

17. The tube connection device according to claim 16 wherein the axial length of the pressure element (13) is directly proportional to the measure of axial length of the bore (10) of the connection element.

18. The tube connection device according to claim 15 wherein the axial length of the pressure element (13) is directly proportional to the measure of axial length of the bore (10) of the connection element.

19. The tube connection device according to claim 14 wherein the axial length of the pressure element (13) is directly proportional to the measure of axial length of the bore (10) of the connection element.

20. The tube connection device according to claim 11 wherein the axial length of the pressure element (13) is directly proportional to the measure of axial length of the bore (10) of the connection element.

* * * * *

UNITED STATES PATENT AND TRADEMARK OFFICE
CERTIFICATE OF CORRECTION

| | | |
|---|---|---|
| PATENT NO. | : 7,533,909 B2 | Page 1 of 1 |
| APPLICATION NO. | : 11/189292 | |
| DATED | : May 19, 2009 | |
| INVENTOR(S) | : Andreas Sausner et al. | |

It is certified that error appears in the above-identified patent and that said Letters Patent is hereby corrected as shown below:

<u>Column 6</u>
Line 3, replace "fining" with --fitting--

Signed and Sealed this

Thirtieth Day of June, 2009

JOHN DOLL
*Acting Director of the United States Patent and Trademark Office*